(12) United States Patent
Lu et al.

(10) Patent No.: US 8,892,304 B2
(45) Date of Patent: Nov. 18, 2014

(54) ADAPTIVE CRASH HEIGHT ADJUSTMENT USING ACTIVE SUSPENSIONS

(71) Applicant: Ford Global Technologies, LLC, Dearborn, MI (US)

(72) Inventors: Jianbo Lu, Livonia, MI (US); Davor Hrovat, Ann Arbor, MI (US); Thomas E. Pilutti, Ann Arbor, MI (US); Jerry H. Engleman, Plymouth, MI (US); Eric H. Tseng, Canton, MI (US); Dimitar P. Filev, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 3 days.

(21) Appl. No.: 13/736,397

(22) Filed: Jan. 8, 2013

(65) Prior Publication Data
US 2014/0195113 A1 Jul. 10, 2014

(51) Int. Cl.
*B60G 23/00* (2006.01)
*G06F 7/00* (2006.01)
*B60G 17/0165* (2006.01)

(52) U.S. Cl.
CPC ................................ *B60G 17/0165* (2013.01)
USPC ............................................. 701/37; 701/36

(58) Field of Classification Search
USPC .................. 701/36–37, 41, 45–48, 301–302; 280/5.5, 5.51; 342/42, 70; 348/148; 340/435–436, 438
See application file for complete search history.

(56) References Cited

U.S. PATENT DOCUMENTS

| 5,231,583 | A | 7/1993 | Lizell | |
|---|---|---|---|---|
| 6,336,515 | B1 * | 1/2002 | Secondari | 180/164 |
| 6,370,461 | B1 * | 4/2002 | Pierce et al. | 701/45 |
| 6,915,196 | B2 | 7/2005 | Rao et al. | |
| 6,944,544 | B1 | 9/2005 | Prakah-Asante et al. | |
| 8,056,392 | B2 * | 11/2011 | Ryan et al. | 73/11.04 |
| 2006/0064223 | A1 * | 3/2006 | Voss | 701/52 |
| 2011/0082623 | A1 * | 4/2011 | Lu et al. | 701/41 |

* cited by examiner

*Primary Examiner* — Yonel Beaulieu
(74) *Attorney, Agent, or Firm* — L.C. Begin & Associates, PLLC (57) ABSTRACT

A vehicle crash safety system includes a pre-crash sensing system configured for gathering and/or receiving target vehicle ride-height data, and at least one actuator operatively coupled to the sensing system and configured for adjusting a height of a portion of a host vehicle responsive to a command from the sensing system. A timing of the command is responsive to an estimated dynamic response time of the at least one actuator.

17 Claims, 7 Drawing Sheets

ADAPTIVE CRASH HEIGHT ADJUSTMENT USING ACTIVE SUSPENSIONS

TECHNICAL FIELD

The present invention relates to pre-crash sensing systems for automotive vehicles, and more particularly, to pre-crash sensing systems providing an adaptive vehicle dynamic state modification for improved collision compatibility.

BACKGROUND OF THE INVENTION

Automobile manufacturers are investigating radar, lidar and vision-based pre-crash sensing systems to improve occupant safety. Such pre-crash sensing systems can be used to deploy active or passive countermeasures to enhance injury mitigation. Such pre-crash sensing systems provide advance warning of imminent collision events such that safety systems can be pre-armed or deployed just prior to impact so that their effectiveness can be maximized.

Vehicle-to-vehicle collision compatibility is an increasingly important safety issue for the automotive industry. That is, the crash compatibility of passenger cars, light trucks and vans in vehicle-to-vehicle collisions could provide potential improvements for passenger safety. An important element in the incompatibility of, for example, passenger cars and light trucks during a collision event, is due to the geometric mismatch between impact-absorbing structures (such as bumpers and longitudinal rails) on the vehicles during collisions. Thus, in cases when a light truck or sport utility vehicle collides with a passenger car, such impact-absorbing structures are not always directly aligned or involved in absorbing the crash energy. Misalignment of these structures can result in higher passenger compartment intrusion levels due to less than desirable energy absorption by the impact-absorbing elements in mismatched front-to-front and front-to-side collisions. Accordingly, to reduce the likelihood of occupant injury, there exists a need for safety systems which can remedy or mitigate geometrical mismatches between vehicles. Further, due to variation in vehicle loads, the vehicle ride-heights before a collision event could also vary. Consequently, there exists a need for new methods and systems to provide improved vehicle-to-vehicle collision compatibility.

SUMMARY OF THE INVENTION

In one aspect of the embodiments of the present invention, a vehicle crash safety system is provided. The system includes a pre-crash sensing system configured for gathering and/or receiving target vehicle ride-height data, and at least one actuator operatively coupled to the sensing system and configured for adjusting a height of a portion of a host vehicle responsive to a command from the sensing system. A timing of the command is responsive to an estimated dynamic response time of the at least one actuator.

In another aspect of the embodiments of the present invention, a vehicle crash safety system is provided. The system includes a pre-crash sensing system configured for gathering and/or receiving target vehicle ride-height data, and at least one actuator operatively coupled to the sensing system and configured for changing a height of a portion of the vehicle responsive to a command from the sensing system. The pre-crash sensing system is also configured for generating the command responsive to a level of downforce to be applied to a road surface by at least one vehicle wheel.

BRIEF DESCRIPTION OF THE DRAWINGS

For a more complete understanding of this invention reference should now be made to the embodiments illustrated in greater detail in the accompanying figures and described below by way of examples of the invention wherein.

DETAILED DESCRIPTION

In the following figures, the same reference numerals will be used to refer to the same components. In the following description, various operating parameters and components are described for one constructed embodiment. These specific parameters and components are included as examples and are not meant to be limiting.

Figure 1:
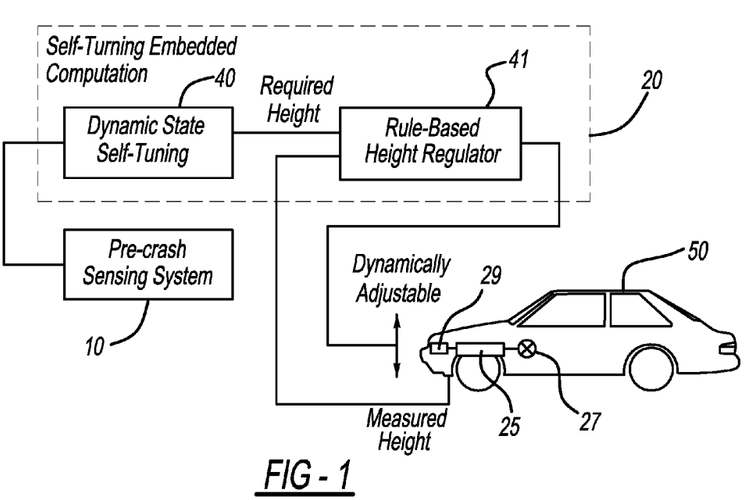
FIG. 1 is a block diagram of one embodiment of an adaptive safety system for collision compatibility in accordance with the present invention.

Referring now to FIG. 1, there is shown a block diagram of one embodiment of adaptive vehicle safety system for collision compatibility in accordance with the present invention. The system 20 is implemented within a host vehicle 50 and operates in coordination with the vehicle pre-crash sensing system 10 and the height-adjustable active suspension system 25. In this example, the adjustable suspension system 25 is an air-based active suspension system such as disclosed in U.S. Pat. No. 5,530,648, assigned to the assignee of the present invention, and herein incorporated by reference. However, the system 20 may alternatively be employed with hydraulically-actuated active suspension systems or active suspension systems incorporating pneumatically, hydraulically, and/or electrically-actuated elements. It will be appreciated that elements and actuators of the active suspension system and any systems or actuators responsible for vehicle height control (if separate from the suspension system) may be hydraulically, pneumatically, electrically or otherwise actuatable, according to factors such as response times required of the particular actuator or system, the levels of forces required from the particular actuator or system, and other pertinent requirements.

In the air-based embodiment of the suspension system, the adjustable suspension system 25 includes one or more adjustable valves 27 having both a valve position regulation for inlet airflow, and a valve position regulation for outlet airflow. That is, the inlet airflow and outlet airflow of the valve can be controlled to dynamically adjust the suspension height. Height adjustment may be available for the front suspension, rear suspension, or independently at each corner of the vehicle in the vicinity of each wheel location. However, other types of known adjustable suspension units 25 may be utilized as well. The present invention is not meant to be limited solely to an air adjustable suspension unit. For example, hydraulic and electronic suspension units could also be used in cooperation with the present control system and method.

The suspension system 25 generally operates in response to signals generated from sensors 29 such as a height sensor and/or inclinometer. As is known, height sensors typically generate continuous analog voltage signals corresponding to the deviation from a nominal vertical distance between the vehicle chassis and the road wheels this distance being commonly referred to as ride-height. Alternatively, ride-height is the measurement of the distance between the chassis and the ground at a particular point on the chassis. The ride-height may be measured at each of the suspension units on the vehicle. A vehicle is typically designed to operate at a desired ride-height. Vehicles equipped with height-adjustable suspension systems can adjust the actual ride-height to maintain the desired ride-height under varying loads. Ride-height sensors may also be integrated within the suspension system 25 with equivalent functionality. The suspension system sensors 29 may also include an inclinometer for determining a relative pitch angle of the chassis from the true horizontal. The inclinometer may comprise any of a number of known electronic leveling tools such as level transducers, or a digital inclinometer. These inclinometers generate a continuous analog voltage signal corresponding to the angular deviation of the chassis relative to the true horizontal.

The possible responses of a vehicle to an impending collision, and the timing of the responses, will depend to a degree on the types of actuators (whether slow-response or fast-response) present in the vehicle. As defined herein, a relatively fast-response actuator is an actuator capable of producing relatively rapid, real time changes in an associated vehicle parameter (for example, the height of a portion of the vehicle) and which can produce continuous adjustments in the vehicle parameter responsive to sensed information which is continuously changing as a target vehicle approaches. In addition, these relatively rapid changes may be achieved in any desired actuation mode or direction. One example of a relatively fast-response actuator is an active hydraulic actuator. Such an actuator may effect relatively rapid changes in vehicle height by either lowering or raising a portion of the vehicle with equal speed. A relatively fast-response actuator is capable of effecting changes in ride-height responsive to commands from RBHR 41 necessary to improve alignment for effective structural interaction between the host and target vehicles, as described herein.

Also, as defined herein, a relatively slow-response actuator is an actuator which is either incapable of effecting relatively rapid real-time changes in an associated parameter, or is incapable of effecting a rapid change in a particular direction. One example of a relatively slow-response actuator may be found in an air suspension system which may have a large blow/leak valve capable of releasing pressure to rapidly reduce the vehicle height just right, but which cannot build or accumulate pressure for raising the vehicle height as quickly. Thus, commands to such actuators may need to given earlier than would otherwise be the case, in order to allow extra time for the actuator to produce the desired effect.

Features such as look-up tables in memory 14 may store information such as dynamic response curves for the various system actuators, sub-systems, and various combinations thereof. The controller may also be configured to update the information in these tables after operating any of the actuators, sub-systems and combinations, and monitoring or receiving feedback on the execution time and (optionally) other response characteristics of the actuators, sub-systems, and combinations. Alternatively, the controller (or other suitable means) may be configured to process feedback from the actuators, sub-systems, and combinations of these components to formulate curves, tables, or other representations of the dynamic responses of these elements. These representations are usable by the controller in predicting the dynamic response times of various actuators, sub-systems, and combinations thereof. Such information can be gathered and compiled during testing or operation of the vehicle safety system. This information can be used predicatively by the controller in formulating control commands to the actuators and in the timing of the control commands, to produce a vehicle-height modification of a desired rate, magnitude, timing, and duration.

The ability of the controller and other systems elements to adapt to the dynamic response characteristics of the actuators, sub-systems, and combinations thereof facilitates retrofitting of the safety system and components to vehicles incorporating a wide variety of suspension systems and associated actuators.

The adaptive vehicle safety system for collision compatibility 20 comprises a ride-height controller called a Dynamic State Self-Tuning (DSST) controller 40 and a Rule-Based Height Regulator (RBHR) 41 to effectively meet safety performance specifications for different vehicle types, ride-heights and crash conditions. The DSST 40 utilizes information from the pre-crash sensing system 10 to monitor the range, range-rate, potential impact time, and object-type information to determine the type of vehicle and bumper/doorsill height information of the detected object. The DSST 40 then determines a desired reference ride-height target and communicates this reference ride-height target to the RBHR 41. The RBHR 41 then manipulates the air suspension system valves 27 positioning to achieve and maintain the reference ride-height to assist in collision compatibility. The RBHR 41 also performs plausibility checks for sensor reliability to discern a confidence level in the information received from the pre-crash sensing system 10 regarding the target vehicle bumper or doorsill height data. Thus, the DSST 40, by setting the desired reference ride-height based upon the remote sensor information, i.e., the pre-crash sensing system 10, sets the framework for systematic decision making by the RBHR 41. The RBHR 41, however, is the primary controller within this architecture for robust occupant protection. As explained in more detail below, the RBHR 41 intelligently adjusts the electronic air suspension valves 27 to reach and maintain the desired vehicle ride-height of the host vehicle to achieve improved robust occupant protection. This automatic fine tuning of the ride-height of the host vehicle is carried out once imminent crash conditions are satisfied until approximately 30-40 ms prior to the impact event. By continuously adjusting the ride-height based upon feedback from the host vehicle 50 state conditions as well as the target vehicle dynamics, the present system 20 improves alignment to maximize the effectiveness of structural interaction between the host and target vehicles. As explained in more detail below, the RBHR 41 incorporates a rule-based inference system which is used to determine an output valve/airflow position value for the electronic air suspension valves 27. In one example, the error or difference between the desired target suspension height and the present height, and the change in height-error undergoes rule-based inference to determine a value depicting the change in required valve position. The embedded computation facilitates achieving the performance specification for the ride-height, in the presence of the non-linear characteristics of valve position and airflow rate.

As shown, the DSST 40 and RBHR 41 architecture forms a central advisory system which feeds information to the local decentralized suspension system 25. However, the entire system can be part of the suspension system 25. The decision-making computations described in detail below which are incorporated into the DSST 40 and the RBHR 41 may be based upon fuzzy reasoning, pattern recognition systems with polynomial and neuro-network classifiers to determine crash conditions, or look-ups in a look-up table corresponding to the collision conditions Further, although the pre-crash sensing system 10, DSST 40, RBHR 41 and suspension controller 25 are shown as separate components, their functions may be incorporated into a single controller having multi-level controller function. In addition, the pre-crash sensing system 10, the DSST 40, RBHR 41, and suspension system 25 including a suspension controller may be microprocessor-based such as each being a computer having a central processing unit, memory (RAM and/or ROM), and associated input and output buses. These controllers may be application-specific integrated circuits or be formed of other logic devices known in the art. They also may form a portion of a central vehicle main control unit, a main safety controller, or may be stand alone controllers as shown.

Figure 2:
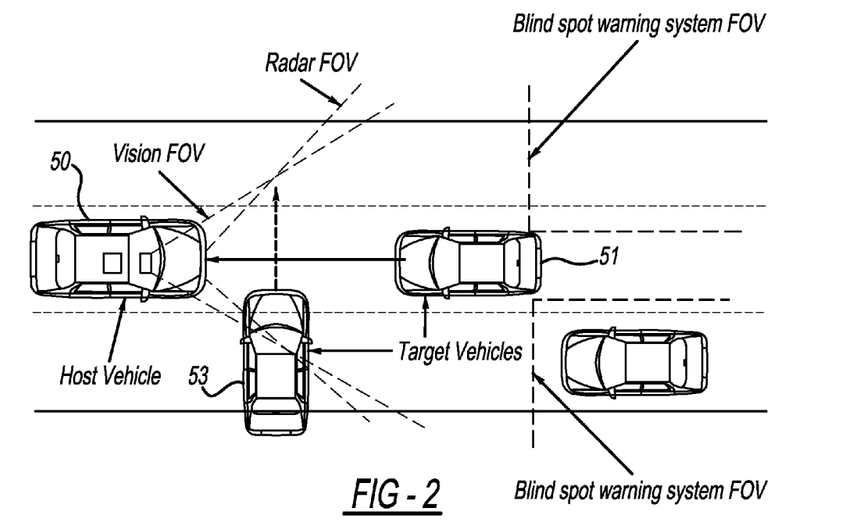
FIG. 2 shows a schematic diagram of a host vehicle having an adaptive vehicle safety system for collision compatibility in exemplary impact scenarios.

FIG. 2 shows a schematic diagram of the host vehicle 50 in different impact scenarios. FIG. 2 shows the field-of-field of the remote sensors which are part of the pre-crash sensing system 10 configured to allow detection of various crash scenarios for target tracking and classification. The sensor locations in this example cover 90 degree frontal impacts, side impacts, off-set and oblique-type collisions, and blind-spot collisions. If the target vehicle 51 has similar bumper height to that of the host vehicle 50, or if the target vehicle 53 has similar side doorsill height as the host vehicle 50 bumper height, no activation or adjustment of the ride-height is performed. The initial conditions of the host vehicle 50 are used to determine the reference ride-height set-points.

Figure 3:
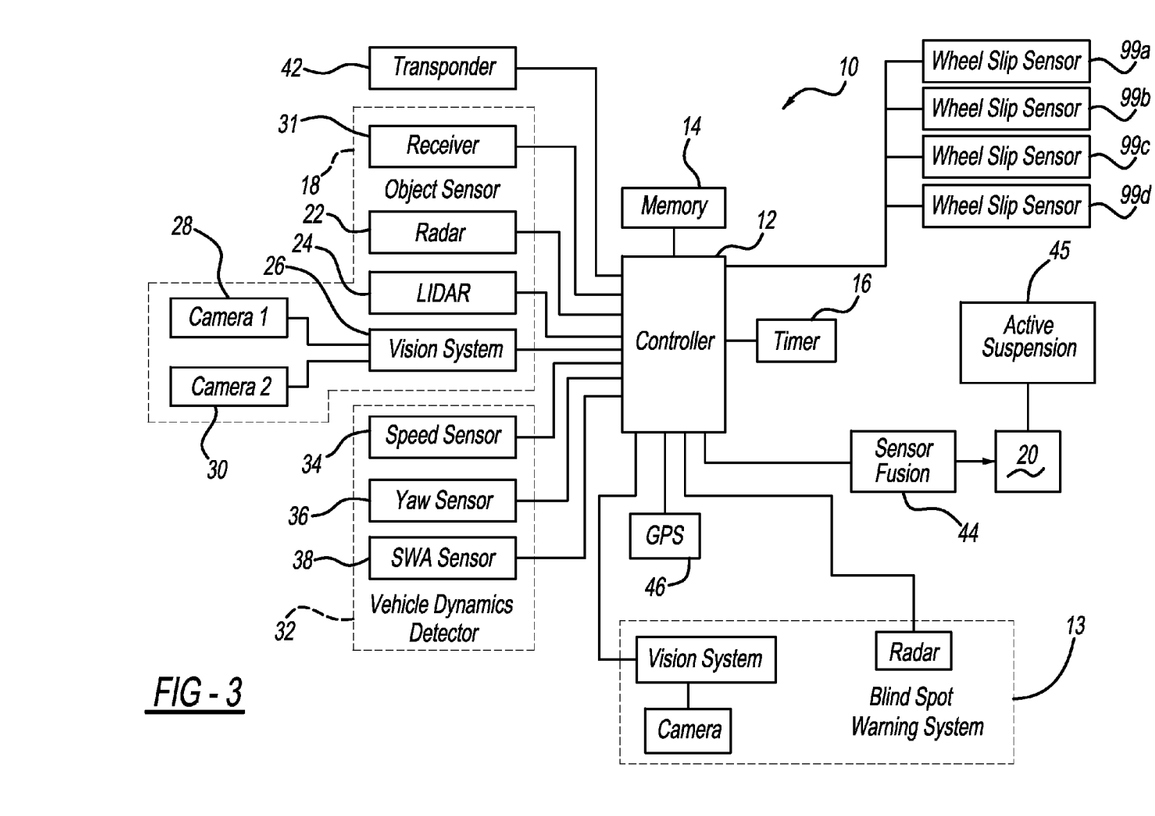
FIG. 3 shows a block diagram of one embodiment of the pre-crash sensing system for the adaptive vehicle safety system for collision compatibility in accordance with an embodiment of the present invention.

FIG. 3 is a block diagram of one embodiment of the pre-crash sensing system 10 providing the remote sensor data to the adaptive vehicle safety system for collision compatibility 20. The pre-crash sensing system 10 incorporates a vision system 26 and radar sensors 22 or lidar sensors 24 to obtain remote information about potential obstacles in the path of the host vehicle 50 before collision. The system 10 may also receive information as transmitted by a target vehicle transponder system. The pre-crash sensing system 10 also provides host vehicle dynamics information. One or more of the object detection systems may be used in a sensor fusion stage which may be included to determine the degree of usefulness of each measured signal input such that the pre-crash sensing controller produces a weighted output from the combination of signals. Means for implementing the sensor fusion stage may be incorporated into controller 12 (described below). The pre-crash sensing system 10 outputs to the DSST 40 range, range rate, potential impact time, and target vehicle data including the type of vehicle and bumper or doorsill height information of the target vehicle. One embodiment of the pre-crash sensing system 10 is shown schematically in FIG. 3.

The pre-crash sensing system 10 of FIG. 3 has a controller 12. Controller 12 can be a microprocessor-based controller that is coupled to a memory 14 and a timer 16. Memory 14 and timer 16 are illustrated as separate components from that of controller 12. However, those skilled in the art will recognize that memory 14 and timer 16 may be incorporated into controller 12.

Memory 14 may comprise various types of memory including read only memory, random access memory, electrically erasable programmable read only memory, and keep alive memory. Memory 14 is used to store various thresholds and parameters as will be further described below.

Timer 16 is a timer such as a clock timer of a central processing unit within controller 12. Timer 16 is capable of timing the duration of various events as well as counting up or counting down. For an example based on time, the acceleration of the vehicle can be determined from a velocity.

A remote object sensor 18 is coupled to controller 12. Remote object sensor 18 generates an object signal in the presence of an object within its field of view. Remote object sensor 18 may be comprised of one or a number of combinations of sensors including a radar 22, a lidar 24, and a vision system 26. Vision system 26 may be comprised of one or more cameras, CCD, or CMOS type devices. As illustrated, a first camera 28 and a second camera 30 may form vision system 26. Both radar 22 and lidar 24 are capable of sensing the presence and the distance of an object from the vehicle. The camera system is also capable of detecting the distance of an object from the vehicle. Alternatively, radar 22 or lidar 24 may be used to detect an object within a detection zone and vision system 26 may be used to confirm the presence of the object within the detection zone and to provide the classification and size of the object as well as bumper/doorsill cation data In another embodiment of the invention vision system consisting of cameras 1 and 2, alone may use established triangulation techniques to determine the presence of an object, the distance from the vehicle and relative velocity of the object as well as the object's size that may include area, height or width, bumper or doorsill location, or combinations thereof. Preferably, the cameras are high-speed cameras operating in excess of 50 Hz. A suitable example is a CMOS-based high dynamic range camera cable of operating under widely differing lighting and contrast conditions.

Referring to FIGS. 2 and 3, elements of a vehicle blind spot warning system 13 may also be operatively coupled to controller 12. As known in the art, a blind spot warning system incorporates sensor/detector elements (such as a radar and/or one or more cameras operable as previously described) positioned near the rear of the vehicle, and controller 12 processes the data from these sensors to alert a driver of vehicles approaching at angles that the driver cannot readily see. The sensor locations in this example cover 90 degree arcs along the rear portion of each side of the vehicle, as shown.

A vehicle dynamics detector 32 is also coupled to controller 12. The vehicle dynamics detector 32 generates a signal or signals indicative of the dynamic conditions of the vehicle. The vehicle dynamics detector 32 may comprise various numbers or combinations of sensors but preferably include a speed sensor 34, a yaw rate sensor 36, and a steering wheel angle sensor 38. In addition, longitudinal acceleration sensor (not shown) may also be included in the vehicle dynamics detector 32. The longitudinal acceleration sensor can provide controller 12 some indication as to the occupant driving characteristics such as braking or deceleration. The vehicle dynamic conditions may also include host vehicle bumper height from the suspension height sensor.

Speed sensor 34 may be one of a variety of speed sensors known to those skilled in the art. For example, a suitable speed sensor may include a sensor at every wheel that is averaged by controller 12. Preferably, controller translates the wheel speeds into the speed of the vehicle. Suitable type of speed sensors 34 may include, for example, toothed wheel sensors such as those employed on anti-lock brake systems.

Yaw rate sensor 36 can provide the yaw rate of the vehicle about the center of gravity of the vehicle. The yaw rate measures the rotational tendency of the vehicle about an axis normal to the surface of the road. Although yaw rate sensor can be located at the center of gravity, those skilled in the art will recognize that the yaw rate sensor may be located in various locations of the vehicle and translated back to the center of gravity either through calculations at the yaw rate sensor 36 or through calculations within controller 12 in a known manner.

Steering wheel angle sensor 38 provides a steering wheel angle signal to controller 12. The steering wheel angle signal corresponds to the steering wheel angle of the hand wheel of the automotive vehicle. The yaw rate sensor 36 and the vehicle speed sensor 34 or the steering wheel angle sensor 38 alone, or the above sensors in combination, may be used to indicate the kinematics of the vehicle.

A global positioning system (GPS) 46 may also be coupled to controller 12. GPS 46 system generates a vehicle position of the host vehicle in response to satellites. Controller 12 may use this information in determining the relative position of the host vehicle and a target vehicle.

Remote object sensor 18 may also include a receiver 31 for receiving a transponder signal from a similarly-equipped target vehicle. Receiver 31 may, however, be a stand alone device. Receiver 31 is also coupled to controller 12. Receiver 31 is used to receive signals from other vehicles or vehicle transponders. Thus, the host vehicle is also equipped with an active transponder 42 capable of communicating with the interrogation systems carried on any other similarly-equipped vehicles, but this equipment is not shown in the figures for purposes of clarity. A transponder 42 may also be coupled to controller 12. Transponder 42 may generate information from controller 12 and transmit it to other vehicles upon the reception of a predetermined frequency signal from another vehicle. Also, transponder 42 may always be activated and broadcasting vehicle information to other vehicles. Transponder 42 and receiver 31 may be located in a common location and integrally formed therewith. Indeed, the host and target vehicles may be equipped with two or more separate transponder units which transmit distinct, differently coded response signals such that the left or driver side of a vehicle can be distinguished from a right or passenger side of a vehicle to aid in the orientation of a detected vehicle relative to the host vehicle.

Some of the static or dynamic target vehicle information contained in the transponder response signal cannot typically be detected by conventional radar or vision systems alone. Among these characteristics are wheel slip, steering wheel position, vehicle weight, bumper height, and precise target vehicle dimensions. Other types of target vehicle information, while detectable by radar or vision systems, can be determined with greater accuracy by the target vehicle's onboard sensors and be transmitted to the host vehicle in the transponder-response signal. Examples include target vehicle dynamic information such as location, velocity, and acceleration as determined by the target vehicle's accelerometers and/or a GPS system.

The overall accuracy and robustness of the pre-crash sensing system can therefore be improved by combining or integrating the radar and vision derived information with the information contained in the transponder-response signal which is potentially more accurate. This additional weighting step is shown in FIG. 3 as a separate sensor fusion controller 44 which may be part of the pre-crash sensing system controller 12. The weighted output from the combination of signals can then be transmitted to the DSST 40 along with the host vehicle dynamics information such that the DSST 40 can have an accurate awareness of the pre-impact scenario.

While certain of the previously-discussed embodiments of the safety system included interactions between similarly equipped vehicles, other embodiments of the safety system may involve interactions between vehicles lacking certain elements of the safety system previously described.

For example, in a particular embodiment, a transponder as described above is operatively coupled (in a retrofit) to a suitable controller and located in a vehicle lacking an active suspension system. While this vehicle may lack the sensors necessary for of the pre-crash sensing functions of a fully-equipped vehicle of the type previously described, and also may lack the associated DSST and RBHR previously described, the retrofit vehicle may be capable of transmitting pertinent static or dynamic target vehicle information (such as wheel slip, steering wheel position, vehicle weight, bumper height, etc., as previously identified) to other, more fully equipped vehicles structured to implement height adjustments responsive to such information. Then, in a possible collision scenario, this fully-equipped/host vehicle can adjust its vehicle height responsive to the information received from the target vehicle. The types of information that may be supplied by the target vehicle to the host vehicle depend on such factors as the types of sensors incorporated into the target vehicle, the controller configuration and capabilities, and other pertinent factors.

The love bumper bar height of most passenger vehicles and light trucks falls within a range of approximately 35 cm to 70 cm. Based upon the known host vehicle data and the detected target vehicle data, the DSST 40 derives a host vehicle ride-height target based upon the co Vision partner characteristics. If the target vehicle has a similar bumper height, no modification of the host vehicle ride-height is performed. The DSST 40 makes use of the initial conditions of the host vehicle to determine the reference ride height set-point. This represents the optimum host vehicle ride-height for the detected imminent crash situation. The RBHR 41 then adjusts the electronic air suspension valves 27 to reach and maintain the target vehicle ride-height of the host vehicle. The RBHR 41 continuously adjusts the ride-height based upon feedback from the host vehicle state conditions as well as the target vehicle's state conditions to improve alignment for effective structural interaction between the host and target vehicles. Adjustment continues until approximately 30-40 ms prior to impact.

Figure 4:
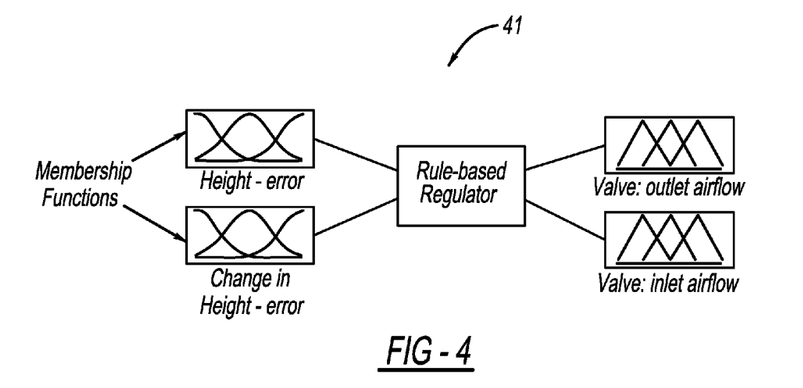
FIG. 4 shows a schematic diagram of one embodiment of the Rule-Based Height Regulator design architecture.

FIG. 4 shows a schematic diagram of the RBHR controller 41 architecture. The RBHR 41 architecture incorporates a rule-based inference system, which is used to determine the valve position for air inflow and air outflow, leading to the adjustment of the suspension height. In this example, the difference or error between the desired host targeted suspension ride-height and the current suspension ride-height, and the change in height-error undergo rule inference to determine a value depicting the change in required valve position. The valve position and airflow rates have non-linear characteristics. Thus, this embedded computation facilitates achieving the performance specifications for the targeted host vehicle ride-height in the presence of these non-linear characteristics.

Figure 5:
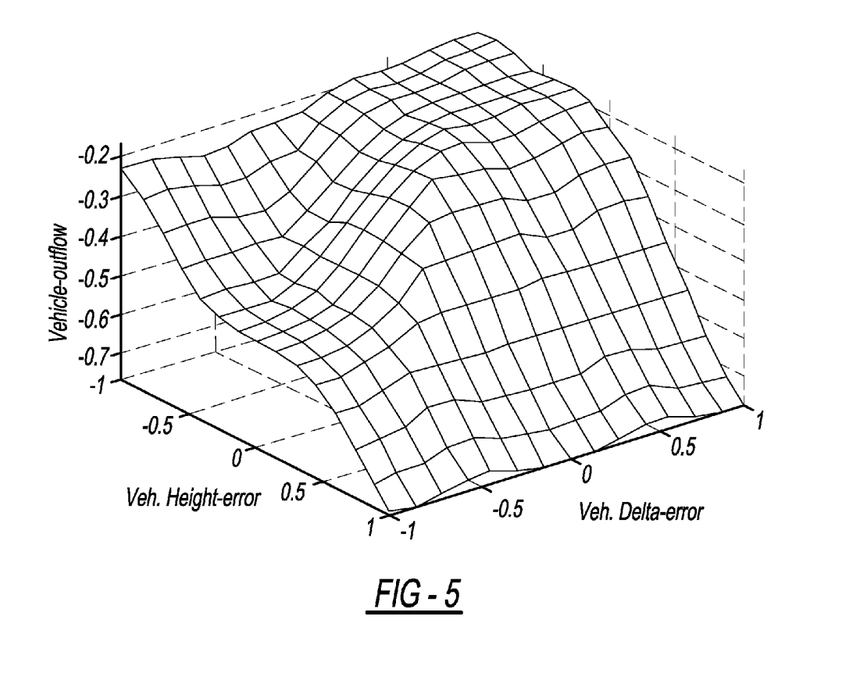
FIG. 5 shows a Rule-Based Height Regulator non-linear surface plot showing the normalized valve position output for air outflow based upon suspension height-error and change in height-error.
Figure 6:
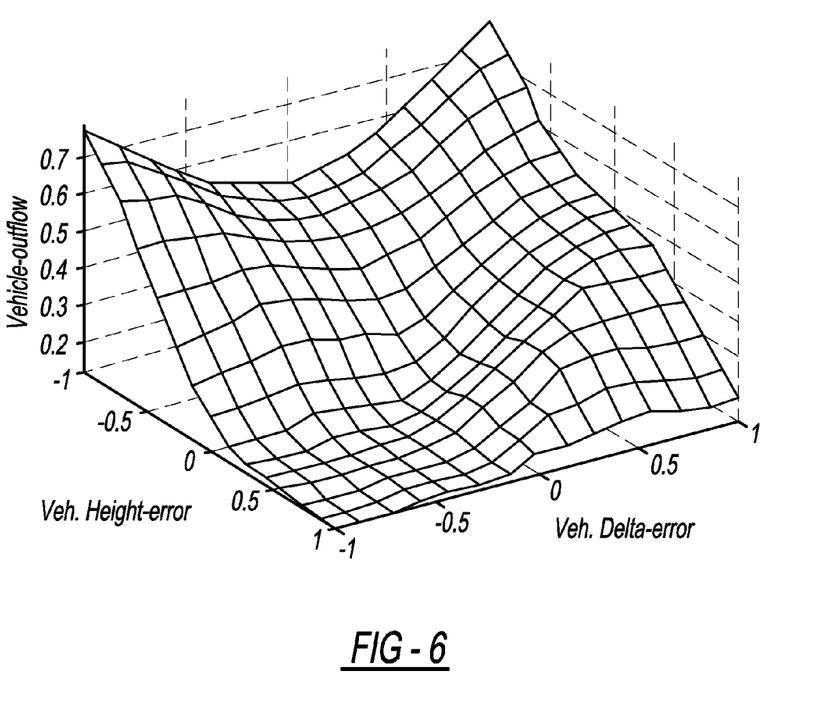
FIG. 6 shows the Rule-Based Height Regulator non-linear surface plot showing normalized valve position output for air inflow based upon suspension height-error and change in height-error.

The RBHR 41 architecture applies to both valve position regulation for inlet airflow and valve position regulation for outlet airflow. FIGS. 5 and 6 show exemplary outputs for the RBHR controller 41. In particular, FIG. 5 shows the RBHR output as a non-linear surface plot showing normalized valve position output for air outflow based upon suspension height-error and change in height-error. FIG. 6 shows one example of the RBHR output as a non-linear surface plot depicting normalized valve position output for air inflow based upon the suspension height-error and change in height-error. These height-error and change in height-error values are estimated by the RBHR from the targeted height and the measured height host vehicle height by the sensors 29 for the suspension system 25 (FIG. 1). Positive valve output values are for a air inflow to raise the electronic air suspension system, and negative valve output values represent air outflow to lower the suspension ride-height. High valve opening values are obtained for larger target ride-height errors. These non-linear surface plots depict the performance of the valve output positions to the electronically controlled air suspension system.

Referring again to FIG. 3, pre-crash sensing system 10 may also be configured to receive information from the active suspension system 25 relating to the normal force or "downforce" exerted on the road surface by the vehicle wheels. The normal force information may be provided by force sensors operatively coupled to the suspension at each wheel.

The forces between the wheels and the road surface and the distribution of forces among the individual wheels are important for providing traction in braking and handling prior to a collision. The timing of initiation of the RBHR 41 suspension height adjustment commands and the lengths of time required to implement the commands by the suspension system and its various actuators can affect the downforces exerted by the wheels on the road surface, which can affect braking and handling of the vehicle prior to collision. For example, as the suspension system at a given wheel acts to raise the corner of the vehicle at that wheel, the downforce exerted by the wheel on the road surface increases. The faster the suspension system at a given wheel acts to raise the corner of the vehicle at that wheel, the greater the increase in force. A faster increase in vehicle height at the wheel produces a greater increase in downforce, but for a relatively shorter period of time that would a more gradual rise the vehicle height. Conversely, a rise in vehicle height executed more gradually over a greater time period may provide a relatively smaller increase in downforce, but for a longer period of time.

In a particular embodiment, the determination of the amount of downforce to be applied is a function of longitudinal tire slip or wheel slip. The tire slip is monitored in real time during application of a braking force by the driver, and evaluated by the controller. If it is determined that the tire slip exceeds a predetermined threshold value, the speed of the increase in the height of the vehicle at the wheel in question (or of one end of the vehicle, or of the vehicle as a whole) may be increased, thereby increasing the downforce. This increase in downforce increases traction/braking force.

Referring to FIG. 3, each one of tire slip sensors 99a-99d may be operatively coupled to an associated one of each of the vehicle wheels. Sensors 99a-99d are also operatively coupled to controller 12. Sensors 99a-99d constantly sense the angular rotations of the respective vehicle wheels in a known manner and transmit the acquired data to the controller.

Figure 8A:
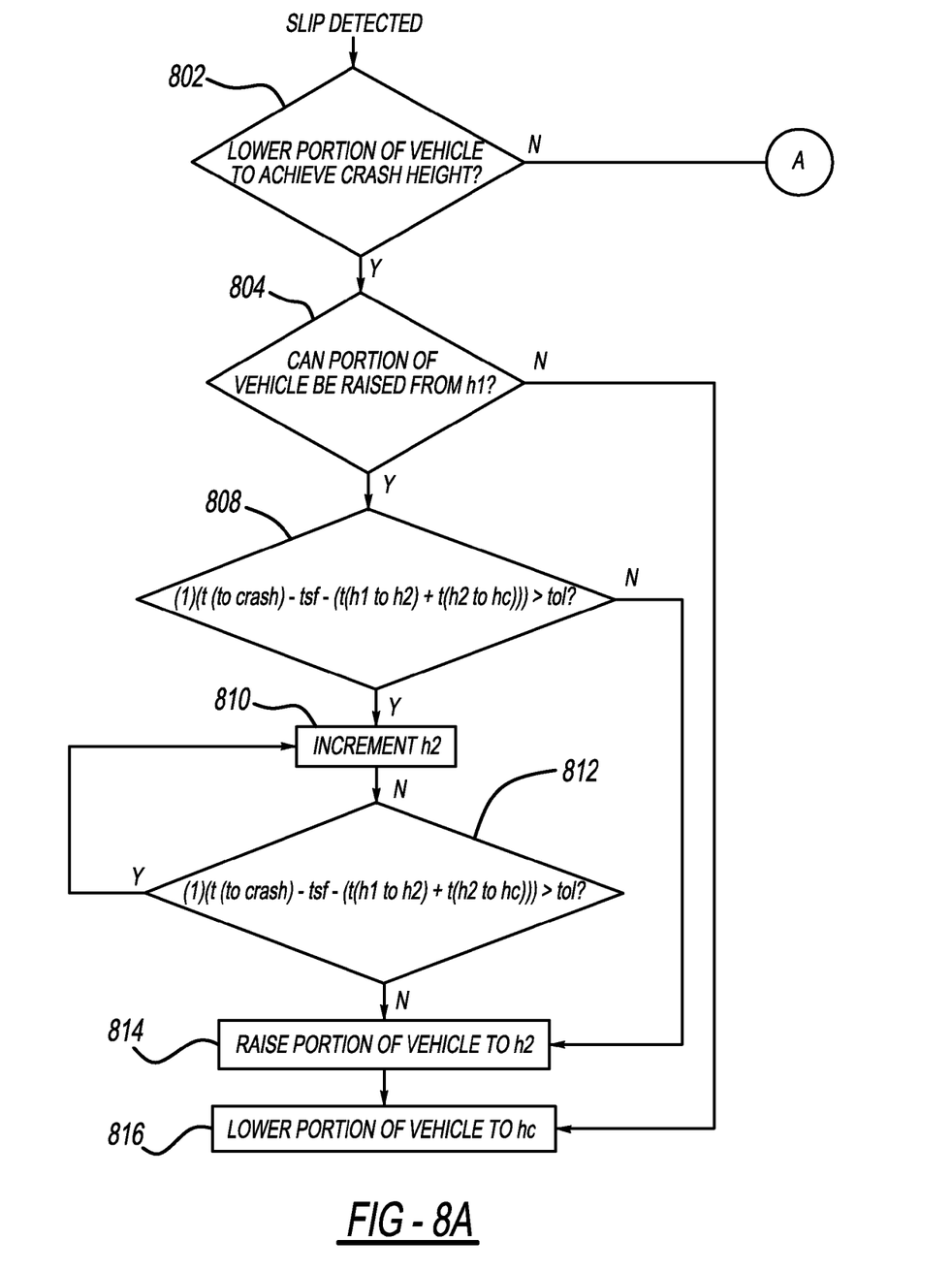
FIGS. 8A-8B show one embodiment of a control flow for one example of an application of the vehicle safety system in response to detected tire slip.
Figure 8B:
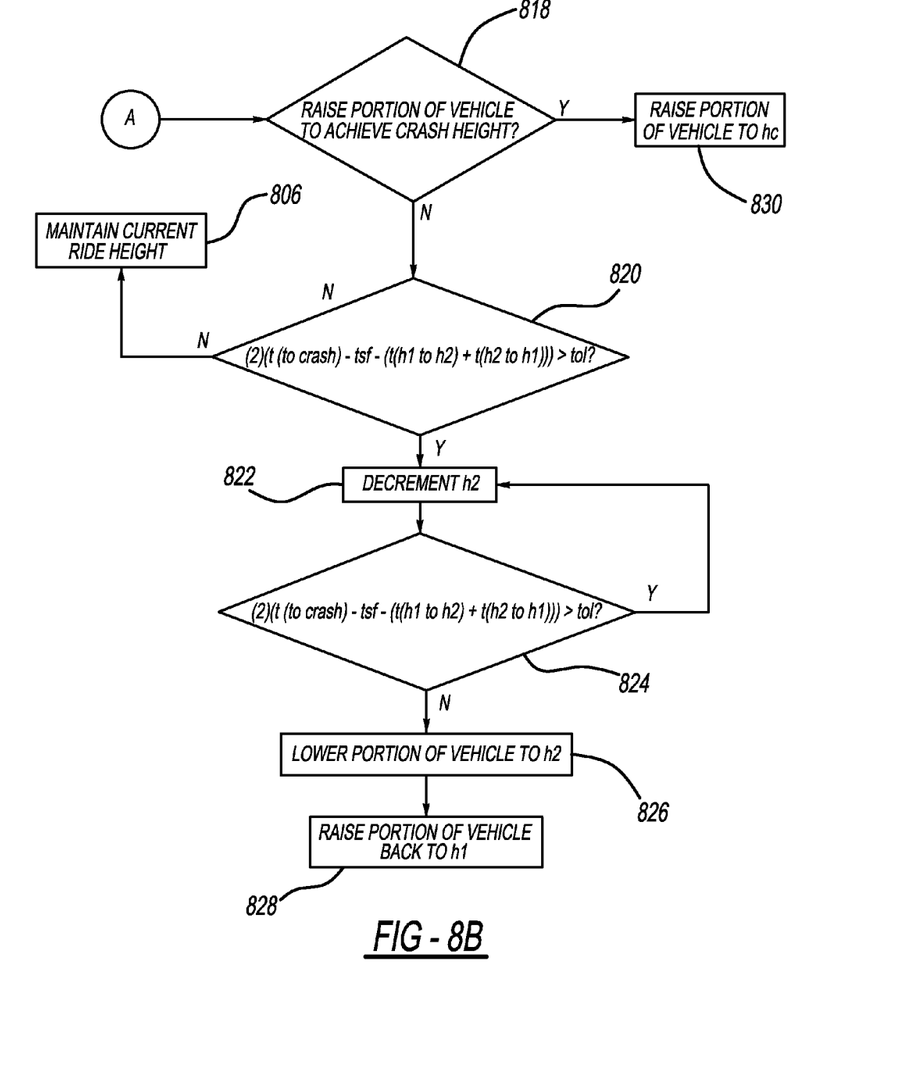

FIG. 8 shows one embodiment of a control flow for one example of an application of the vehicle safety system in response to detected tire slip. Referring to FIG. 8, in step 802, once the brakes have been applied and a slip condition detected, if it is determined by the controller that the tire slip in one or more wheels exceeds a predetermined threshold value during the braking operation, the speed of the increase in the height of the vehicle at the wheel in question (or of one end of the vehicle, or of the vehicle as a whole) may be increased, thereby increasing the downforce. This increase in downforce increases traction/braking force. In a particular embodiment, the raising and lowering of the portion of the vehicle for downforce control is implemented at the maximum speed attainable by the suspension system.

In step 802 of the control mode illustrated in FIG. 8, after application of the brakes and detection of a tire slip condition in one or more wheels, the controller determines if the portion of the vehicle that will be subject to collision must be lowered ride height h1 to achieve the desired ride height h(c) for collision compatibility. Whether the portion of the vehicle is to be raised or lowered will have been determined earlier upon detection of a possible crash scenario, in the manner previously described.

In step 804, if the portion of the vehicle is to be lowered to achieve collision compatibility, the controller compares the current ride height h1 to the maximum ride height h(max) achievable by the suspension system, to determine if the portion of the vehicle can be raised from the current ride height to increase the downforce. If the ride height cannot be raised, it is assumed that the ride height is at its maximum value h(max). Since the ride height cannot be raised any further, the portion of the vehicle is lowered to the desired ride height h(c) (at step 816).

In step 808, if the portion of the vehicle can be raised from the current ride height, a ride height h2 is initialized at a value slightly greater than h1 and which is achievable and maintainable by the suspension system a ride height position corresponding to a maximum distance which the ride height may deviate from h1 and still have sufficient time to be adjusted to the desired ride height h(c) for collision compatibility.

The initial value of h2 is then evaluated using the relationship:

$$(t(\text{to crash})-tsf-(t(h1 \text{ to } h2)+t(h2 \text{ to } hc)))>tol \qquad (1)$$

where:

t(to crash)=the estimated time to collision, t(h1 to h2)=the estimated system response time required for the portion of the vehicle to move from h1 to h2 t(h2 to hc)=the estimated system response time required for the portion of the vehicle to move from h2 to hc;

tol=a positive tolerance value. In one embodiment, the value of tol is set to as close to zero as possible, to permit the downforce to be increased for as long a period as possible.

tsf=an optional safety factor calculated to provide a quantity of additional time, to help ensure that the height hc is achieved in time for the collision.

The values of tol and tsf take into account such factors as the computation time required for the incrementation of h2 and the associated iterations, the dynamic response times of the system and its components during switching between raising and lowering of portions of the vehicle, the precision to which the ride height can be controlled by the suspension, and other pertinent factors. The factors tol and tsf may be determined for a given system design and stored in a memory. These factors may also be adjusted or re-programmed, if desired. In general, the values of tol and is be set so as ensure that initiation of the ride height adjustment be initiated prior to the quantity (t(to crash)−tsf−(h1 to h2)+t(h2 to hc))) falling below zero.

The system response times required to raise (at a given rate of movement) a given portion of the vehicle from any initial height h1 at or between the maximum and minimum heights achievable by the suspension to any desired height at or between the maximum and minimum heights, can be determined analytically or by testing and stored in memory in the form of actuator response curves, look-up tables or any other suitable means. Similarly, the system response times required to lower (at a given rate of movement) a given portion of the vehicle from any initial height h1 at or between the maximum and minimum heights achievable by the suspension, to any desired height at or between the maximum and minimum heights, can be determined analytically or by testing and stored in memory in the form of actuator response curves, look-up tables, or any other suitable means.

In step 808, if the value of h2 is such that the relation (t(to crash)−tsf−h1 to h2)+t(h2 to hc)))>tol not satisfied, it is assumed that there is not enough time before the collision for the ride height to be raised to h2 and then lowered to hc. In this case, the portion of the vehicle is lowered to the desired ride height h(c) (at step 816).

If the value of h2 is such that the relation (t (to crash)−tsf−(t(h1 to h2)+t(h2 to hc)))>tol is satisfied, it is assumed that sufficient time remains before the collision for the ride height to be raised to h2 and then lowered to hc. Then the control flow proceeds to step 810, where the value of h2 is incremented.

As used herein, the term "incremented" is understood to mean that the ride height h2 to which the portion of the vehicle will be moved (in this case, raised) if movement is implemented for the purpose of increasing downforce, is raised slightly by a discrete amount for computational purposes, to determine if sufficient time will remain for lowering the portion of the vehicle from h2 to hc.

After the value of h2 is incremented, control passes to step 812 for re-evaluation of relation (1) using the incremented value of h2.

In step 812, if the new value of h2 is such that the relation (t (to crash)−tsf−(t(h1 to h2)+t(h2 to hc)))>tol is not satisfied, it is assumed that the maximum value of h2 has been determined. Thus, there is no longer any time remaining in which to her raise the vehicle if the vehicle is to be returned from its raised position to the crash height hc. Thus, the portion of the vehicle is raised in step 814 to increase the downforce, and then lowered in step 816 to the desired crash height hc.

If the new value of is such that the relation t(to crash)−tsf−(t(h1 to h2)+t(h2 to hc)))>tol is satisfied, it is assumed that sufficient time remains before the collision for the ride height to be raised to h2 and then lowered to hc. Then the control proceeds to step 810, where the value of h2 is again incremented.

During incrementing and evaluation of h2 in the loop defined by steps 810-812, the quantity t(to crash) is constantly decreasing and the quantity tsf remains constant, while the quantities t(h1 to h2) and t(h2 to hc) increase, due to the increasing distance of h2 from h1 and hc. Thus, the opposite sides of the equation will tend to converge as time passes. For purposes of downforce control, this convergence determined to have occurred when the quantity (t (to crash)−tsf−(t(h1 to h2)+t(h2 to hc))) falls below the value of tol, at which point the portion of the vehicle is raised and then lowered. Incrementation of h2 continues until relationship (1) is not satisfied, at which point the maximum value of h2 has been determined.

Using the method just described enables the maximum downforce level to be achieved for a given initial ride height of the vehicle and a given estimated time remaining until the collision, and for the maximum allowable time period.

Referring now to step 818, if it is determined in step 802, that the portion of the vehicle is to be not to be lowered to achieve collision compatibility, the controller determines if the portion of the vehicle is to be raised to achieve collision compatibility.

If the portion of the vehicle is to be raised to achieve collision compatibility, then control proceeds to step 830 where the portion of the vehicle is raised to the desired crash height hc. However, if it is determined in step 818 that the portion of the vehicle is not to be raised to achieve collision compatibility, the portion of the vehicle is assumed to already be at the crash height hc. In this case, it is desired to determine if enough time remains before the collision to lower the portion of the vehicle and then raise the portion of the vehicle back to the desired crash height hc. This would provide additional downforce to aid in alleviating the tire slip condition prior to collision.

In step 820, h2 is initialized at a value below h1 (since it is to be determined whether time remains for the portion of the vehicle to be lowered, rather than raised). Then, the initial value of h2 is evaluated using the relationship:

$$(t(\text{to crash}) - tsf - (t(h1 \text{ to } h2) + h2 \text{ to } h1)) > tol \qquad (2)$$

In this case since the portion of the vehicle starts at the desired crash height hc, the portion of the vehicle is to be returned to h1 after lowering to h2.

If the value of h2 is such that the relation (t(to crash)−tsf>t (h1 to h2)+t(h2 to h1)) is not satisfied, it is assumed that there is not enough time to before the collision for the ride height to be lowered to h2 and then raised back to h1. In this case, the ride height is maintained at its current value in step 806.

If the value of h2 is such that the relation (t(to crash)−tsf>t (h1 to h2)+t(h2 to h1) is satisfied, it is assumed that sufficient time remains before the collision for the ride height to be lowered to h2 and then raised to h1. Then the control flow proceeds to step 822, where the value of h2 is decremented.

As used herein, the term "decremented" is understood to mean that the ride height h2 to which the portion of the vehicle will be moved (in this case, lowered) if movement is implemented for the purpose of increasing downforce, is lowered slightly by a discrete amount for computational purposes, to determine if sufficient time will remain for raising the portion of the vehicle from h2 back to h1

In step 822 the value of h2 is decremented and the relation (2) is evaluated using the new value of h2.

In step 824, if the relationship (2) is not true, then it is determined that the amount of time allowable for lowering the portion of the vehicle to h2 and then raising the vehicle from h2 to h1 is equal to the time remaining before the collision, minus the safety factor. Thus, there is no longer any time remaining in which to further lower the vehicle if the vehicle is to be returned from its lowered position to the crash height h1. Thus, the portion of the vehicle is lowered in step 826, and then raised in step 828 to the desired crash height h1 increase the downforce.

Knowing the distance and relative approach rate of the target vehicle, the estimated system or actuator dynamic response time required to produce the desired suspension effect (whether raising or lowering of the vehicle) at the wheel, and other pertinent information, the timing of initiation of the suspension command and the duration of time over which the command is executed may be tailored so as to maximize (or otherwise optimize) the downforce applied to the road surface by one or more wheels for the maximum (or otherwise optimum) amount of time prior to the collision event, once the possibility of a collision has been discerned. This flexibility aids in providing the maximum amount of vehicle control prior to the collision event, to aid a driver in possibly avoiding the collision event, and enables maximum braking effectiveness and vehicle handling control prior to the collision event.

In addition, the wheel force information can be used to operate actuator(s) controlling the timing of application of the vehicle brakes and braking force. For example, when the front brakes are applied, the vehicle will tend to pitch forward to some degree, thereby momentarily increasing the downforce at the front wheels. The timing of the brake force and its intensity may be controlled to time the pitching movement of the vehicle, further increase the downforce at the front wheels prior to a collision event.

The DSST 40 may be configured (using a processor and/or suitable look-up tables or a database, for example) to evaluate pertinent received data to determine the probability (given the road conditions, the closing speed of the vehicles, the momentum of the host vehicle, the condition of the host vehicle brakes and other pertinent factors) that a projected increase in normal force would enable a collision to be avoided. In instances where the implementation of the desired suspension height changes conflict with a need for maximum normal forces for braking and vehicle control, the system 20 may be configured to give the normal force requirements priority over the suspension height requirements determined that the co on may be avoided. Alternatively, if collision avoidance is deemed unlikely, priority could be given to the vehicle height requirements.

In one embodiment, the DSST 40 processes the normal force information and information on the optimum timing of the suspension commands is passed to the RBHR 41 along with the desired reference ride-height target. The RBHR 41 then executes (at the optimum calculated time and over the optimum calculated time period) suspension commands directed to achieving and maintaining the reference ride-height to assist in collision compatibility.

Figure 7:
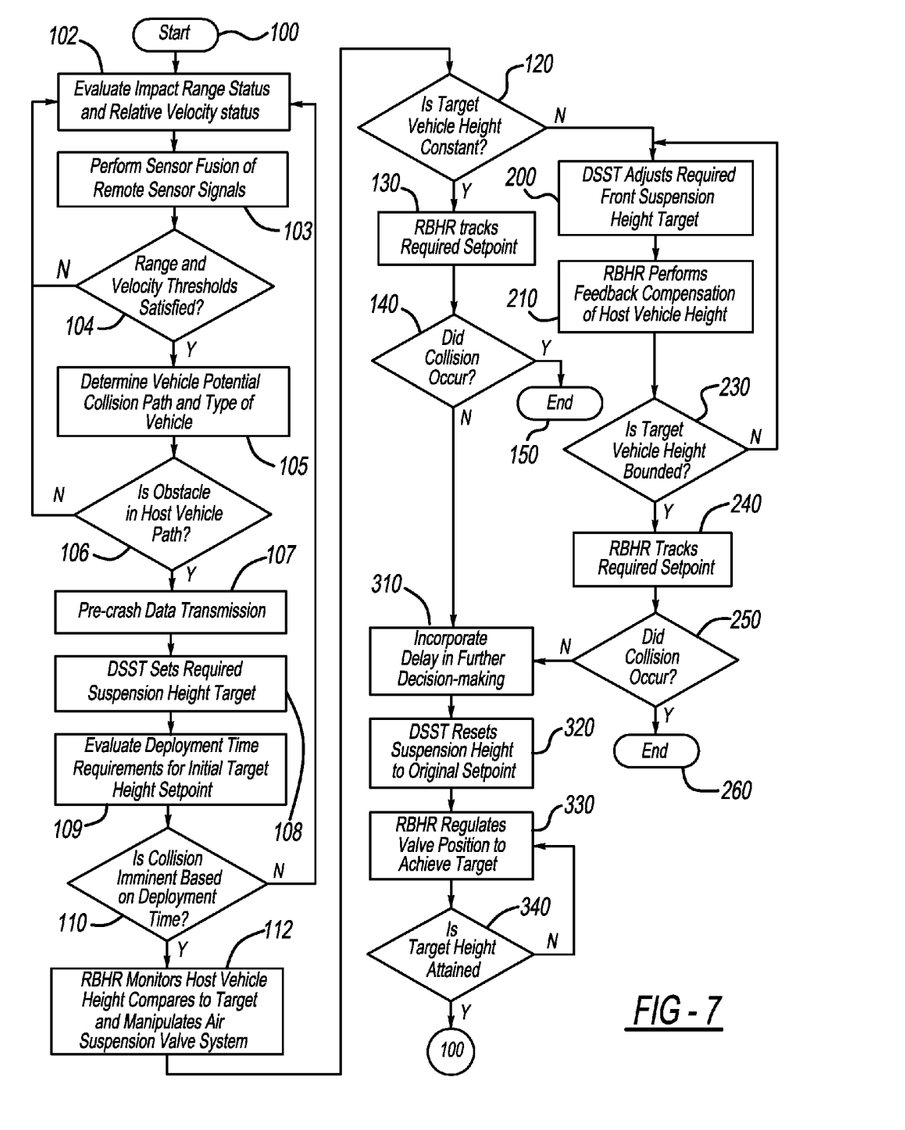
FIG. 7 shows a logic flow diagram of one method of implementing an adaptive safety system for collision compatibility in accordance with the present invention.

FIG. 7 shows a logic flow diagram of one method of implementing an adaptive vehicle safety system for collision compatibility in accordance with one embodiment of the present invention. The logic routine starts at step 100. Steps 102-107 are related to the pre-crash threat assessment system. Thus, step 102 evaluates the impact range status and relative velocity status of the host and target vehicles. This may include, at step 103, performing sensor fusion of the remote sensor signals wherein the control system determines the degree of confidence or usefulness of each measured signal input and produces a weighted output from the combination of signals. These signals may include vision system signals, radar or lidar system signals and transponder/receiver communications. If the range and velocity thresholds are satisfied in step 104, the obstacle or target vehicle information is determined in step 105 and a decision is made whether the target vehicle is in the host vehicle path making collision likely in step 106. Otherwise, the system continues to evaluate detected target vehicles and objects in step 102. If the target vehicle is in the host vehicle's path, the predicted time to collision is rendered in step 107. The pre-crash data is transmitted in 107 to the DSST. Such information may include the to collision as well as the type of vehicle, i.e., passenger car, truck or van, and bumper height or doorsill height information for the target vehicle.

Given the predicted crash scenario, in step 108, the DSST sets a required suspension height target bounded within an error tolerance of the system. The suspension height set in step 108 may be based on the front bumper bar height of the host vehicle or doorsill height for the host vehicle. In step 109, the DSST evaluates deployment time requirements necessary to achieve the reference ride-height set point. In step 110, a decision is made whether the collision is imminent and the desired, suspension ride-height adjustment can be made within the time window prior to impact. If the time window is satisfied, the RBHR analyzes the host vehicle ride-height and compares it to the target vehicle ride-height and manipulates the air suspension valve system as described above to achieve the reference host vehicle ride-height target.

For a period of time up to approximately 30-40 ms prior to impact, the RBHR controller receives feedback regarding the host vehicle ride-height and target vehicle ride-height data. Accordingly, in step 20 if the target vehicle ride-height is determined to be constant, the logic continues to step 130 wherein the RBHR manipulates the suspension system to achieve the desired reference host vehicle ride-height set-point. This continues in step 140 until the crash event. If, in step 120, the target vehicle height is not determined to be constant, the logic continues to step 200 and 210. In step 200, the DSST adjusts the reference host vehicle ride-height set point within the error tolerances of the system. In step 210, the RBHR performs feedback compensation of the host the system vehicle ride-height to achieve the adjusted targeted ride-height. If the target vehicle height is not bounded, in step 230, then the DSST continuously adjusts the targeted host vehicle ride height and transmits this information to the RBHR to perform feedback control of the suspension system to achieve the new targeted host vehicle ride-height. That is, if the target vehicle is not determined to be at a relatively constant height, then it is subject to change, and the host vehicle must accordingly compensate for the same. Otherwise, of the target vehicle height is relatively constant, the RBHR controls the suspension system to the desired host vehicle ride-height set-point in step 240 until the collision occurs in step 250. In cases when collision does not occur, in steps 310-340, the DSST resets the host vehicle suspension height to the original set-point with reference to any time delay necessary to incorporate any changes. In step 320, the DSST resets the suspension height to the original set-point. In step 330, the RBHR then regulates the valve position to achieve the target ride-height as determined in step 320. Thus, steps 310 through 340 reset the vehicle ride-height to its original set-point in the event that a collision does not actually occur.

In another example of a control mode directed to increasing collision compatibility, where both the host and target vehicles are similarly equipped with relatively as response actuators and all of the elements of a complete system 20 as shown in FIGS. 1 and 3, real-time vehicle height adjustment information can be communicated between the vehicle to coordinate adjustment of both vehicle heights prior to a collision, to maximize vehicle height compatibility. This mode can be executed for a vehicle approaching from any direction covered by vehicle sensors.

In a particular embodiment where both vehicles include forward collision warning(FCW) systems, and using information from the FCW systems, the heights of the front portions of the vehicles may be adjusted in a coordinated fashion responsive to information from the pre-crash sensing system.

In another particular embodiment, in a host vehicle equipped with a blind spot a warning system, the system can reduce or raise the height of the rear portion of the vehicle to increase crash compatibility.

In a vehicle equipped with relatively slow-response actuators for actuating vehicle height control elements, execution of the height adjustment commands may be initiated with sufficient lead time to ensure that the desired vehicle height is achieved by the time collision occurs.

While particular embodiments of the invention have been shown and described, numerous variations and alternative embodiments will occur to those skilled in the art. Accordingly, it is intended that the invention be limited only in terms of the appended claims.

What is claimed is:

1. A vehicle crash safety system comprising:
a pre-crash sensing system configured for gathering and/or receiving target vehicle ride-height data; and at least one actuator operatively coupled to the sensing system and configured for adjusting a height of a portion of a host vehicle responsive to a command from the sensing system, the sensing system being configured for timing a transmission of the command to the at least one actuator responsive to at least a current ride-height of the vehicle.

2. A vehicle crash safety system comprising:
a pre-crash sensing system configured for gathering and/or receiving target vehicle ride-height data; and
at least one actuator operatively coupled to the sensing system and configured for adjusting a height of a portion of a host vehicle responsive to a command from the sensing system, the sensing system being configured for timing the command responsive to an estimated dynamic response time of the at least one actuator,
wherein the pre-crash sensing system is configured for generating host vehicle dynamics data, a target vehicle threat assessment, and target vehicle bumper or doorsill location data, and wherein the system further comprises a Dynamic State Self-Tuning (DSST) controller in electronic communication with said pre-crash sensing system, said DSST controller generating a reference ride-height signal as a function of said host vehicle dynamics data, target vehicle threat assessment, and target vehicle bumper or doorsill location data; and a Rule-Based Height Regulator (RBHR) controller in operative communication with said DSST controller and an adjustable suspension system.

3. The safety system of claim 2 wherein the RBHR controller is programmed to adjust the height of the portion of the vehicle by operating the at least one actuator, in response to said reference ride-height signal and measured host vehicle suspension height, when said target vehicle threat assessment indicates an imminent crash event; and wherein said RBHR controller output modifies said host vehicle suspension height as a function of a height-error signal related to said target and host vehicle ride-heights, and said RBHR incorporates a multivariable rule-based strategy for vehicle suspension height adjustment.

4. The safety system of claim 1 wherein the at least one actuator is a relatively slow-response actuator.

5. The safety system of claim 1 wherein the at least one actuator is a relatively fast-response actuator.

6. The safety system of claim 1 wherein the pre-crash sensing system includes a controller configured to formulate a representation of a dynamic response of the at least one actuator.

7. The safety system of claim 1 wherein the sensing system includes a blind spot warning system, and wherein the height-adjustment command is generated responsive to input from the blind spot warning system.

8. The safety system of claim 1 wherein said pre-crash sensing system comprises at least one of a vision system, radar system, lidar system, or transponder/receiver system.

9. The safety system of claim 2 wherein said target vehicle threat assessment includes target range, closing velocity, approach angle and target vehicle type.

10. The safety system of claim 1 wherein said vehicle dynamics data includes vehicle speed, yaw rate, steering wheel angle and bumper height.

11. The safety system of claim 2 wherein said pre-crash sensing system comprises a sensor fusion stage producing said target vehicle threat assessment as a weighted output of signals from at least two of said vision system, radar system, lidar system, or transponder/receiver system.

12. A vehicle crash safety system comprising:
a pre-crash sensing system configured for gathering and/or receiving target vehicle ride-height data; and
at least one actuator operatively coupled to the sensing system and configured for changing a height of a portion of the vehicle responsive to a command, wherein the command is generated responsive to a level of downforce to be applied to a road surface by at least one vehicle wheel.

13. The safety system of claim 12 wherein the system is configured for timing initiation of the command responsive to an estimated dynamic response time of the at least one actuator.

14. The safety system of claim 12 wherein the at least one actuator is configured to control timing of application of vehicle brakes.

15. The safety system of claim 12 wherein the a pre-crash sensing system is configured for generating host vehicle dynamics data, a target vehicle threat assessment, and target vehicle bumper or doorsill location data, and wherein the system further comprises a Dynamic State Self-Tuning (DSST) controller in electronic communication with said pre-crash sensing system, said DSST controller generating a reference ride-height signal as a function of said host vehicle dynamics data target vehicle threat assessment, and target vehicle bumper or doorsill location data; a Rule-Based Height Regulator (RBHR) controller in operative communication with said DSST controller and an adjustable suspension system, said RBHR controller programmed to adjust the host vehicle suspension height by said suspension system, in response to said reference ride-height signal and measured host vehicle suspension height, when said target vehicle threat assessment indicates an imminent crash event; and wherein said DSST controller and said RBHR controller comprise a centralized ride-height controller architecture separate from said adjustable suspension system.

16. The safety system of claim 1 wherein the system is configured for timing a transmission of the command to the at least one actuator responsive to an estimated dynamic response time of the at least one actuator.

17. The safety system of claim 1 wherein the system is configured for timing a transmission of the command to the at least one actuator responsive to an estimated time until occurrence of a collision event.

* * * * *